United States Patent
Rinde et al.

(10) Patent No.: US 6,224,710 B1
(45) Date of Patent: May 1, 2001

(54) METHOD OF APPLYING PROTECTIVE COVERING TO A SUBSTRATE

(76) Inventors: James Rinde, 666 Mission Creek Ct., Fremont, CA (US) 94539; George Pieslak, 199 Heather Dr., Atherton, CA (US) 94025; Leon C. Glover, 1131 Buckingham Dr., Los Altos, CA (US) 94024

(*) Notice: Subject to any disclaimer, the term of this patent is extended or adjusted under 35 U.S.C. 154(b) by 0 days.

(21) Appl. No.: 09/014,720

(22) Filed: Jan. 28, 1998

Related U.S. Application Data

(60) Continuation of application No. 08/481,594, filed on Jun. 7, 1995, now abandoned, which is a division of application No. 08/212,632, filed on Mar. 11, 1994, now abandoned.

(51) Int. Cl.$^7$ .................................................. B32B 7/00
(52) U.S. Cl. ............................ 156/310; 156/86; 428/420; 523/457
(58) Field of Search ..................... 156/310, 86; 428/420; 523/457

(56) References Cited

U.S. PATENT DOCUMENTS

| | | |
|---|---|---|
| Re. 30,006 | 5/1979 | Sakayori et al. . |
| 3,226,807 | 1/1966 | Orr . |
| 3,231,443 | 1/1966 | McNulty . |
| 3,396,460 | 8/1968 | Wetmore . |
| 3,402,742 | 9/1968 | O'Brien, Jr. . |
| 3,420,277 | 1/1969 | Ceintrey . |
| 3,502,492 | 3/1970 | Spiller . |
| 3,525,656 | 8/1970 | Kennedy, Jr. . |
| 3,616,006 | 10/1971 | Landgraf . |
| 3,625,259 | 12/1971 | Kennedy, Jr. . |
| 3,700,520 | 10/1972 | Hielema . |
| 3,759,751 | 9/1973 | Smith . |
| 3,787,452 | 1/1974 | Leumann et al. . |
| 3,802,908 | 4/1974 | Emmons . |
| 3,823,045 | 7/1974 | Hielema . |
| 3,867,322 | 2/1975 | Leumann et al. . |
| 3,876,606 * | 4/1975 | Kehr ..................................... 523/457 |
| 4,018,733 | 4/1977 | Lopez et al. . |
| 4,048,355 | 9/1977 | Sakayori et al. . |
| 4,079,168 | 3/1978 | Schwemmer et al. . |
| 4,094,715 | 6/1978 | Henderson et al. . |
| 4,142,555 | 3/1979 | Satake et al. . |
| 4,181,775 | 1/1980 | Corke . |
| 4,192,697 | 3/1980 | Parker et al. . |
| 4,200,676 | 4/1980 | Caponigro et al. . |

(List continued on next page.)

FOREIGN PATENT DOCUMENTS

| | | |
|---|---|---|
| 1965802 | 7/1976 | (DE) . |
| 0 065 838 | 12/1982 | (EP) . |
| 0 488 949 | 6/1992 | (EP) . |
| 0 495 560 | 7/1992 | (EP) . |
| 0 586 782 | 3/1994 | (EP) . |
| 1427260 | 3/1976 | (GB) . |
| 1542333 | 3/1979 | (GB) . |
| 2076693 | 12/1981 | (GB) . |
| 50-17483 | 2/1975 | (JP) . |
| 54-5432 | 3/1979 | (JP) . |
| 54-96571 | 7/1979 | (JP) . |
| 56-117642 | 2/1980 | (JP) . |
| 55-123626 | 9/1980 | (JP) . |
| 57-19062 | 2/1982 | (JP) . |
| 58-219271 | 12/1983 | (JP) . |
| 59-52783 | 3/1984 | (JP) . |
| 59-62373 | 4/1984 | (JP) . |
| 59-91055 | 5/1984 | (JP) . |
| 59-123574 | 7/1984 | (JP) . |
| 59-222275 | 12/1984 | (JP) . |
| 59-225775 | 12/1984 | (JP) . |
| Wo 94/12581 | 6/1994 | (WO) . |

OTHER PUBLICATIONS

Air Products Brochure, "Amicure® PACM Curing Agent Improved High–Temperature Performance in Two–Component Adhesives", Publication No. 125–9310.
Basic Principles of Organic Chemistry, John D. Roberts and Marjorie C. Caseri, pp. 563–564, 664 (1965).
Chemical Abstracts Database, vol. 77, No. 6, Aug. 7, 1972, No. 36543: Hungarian Patent No. 348628, "Anticorrosive Epoxy Resin Coatings, etc.", Jan. 28, 1972 (abstract only).
Derwent WPI Database, abstract No. 84–033500(06): Japanese Patent Publication No. 58–222810 (Kurimoto Iron Works), Dec. 24, 1983 (abstract only).
Derwent WPI Database, abstract No. 86–153659(24): Japanese Patent Publication No. 61–088404 (Sumitomo Bakelite KK), May 6, 1986 (abstract only).
Derwent WPI Database, abstract No. 90–167868: Japanese Patent Publication No. 2–108533 (Nitto Denko Corp.), Apr. 20, 1990 (abstract only).
Handbook of Epoxy Resins, Henry Lee and Kris Neville, Chapter 5 (1967).
Mannesmann "MAPEC" Brochure, "3–Layer Corrosion Protection of Large–diameter Pipe", Mar. 1983.
Mark Tool Co. "Splashtron" Brochures (date unknown).
Survey of Organic Syntheses, Calvin A. Buehler and Donald E. Pearson, p. 900 (1970).

(List continued on next page.)

*Primary Examiner*—John J. Gallagher

(57) ABSTRACT

A curable polymeric composition which is a liquid at 20° C. and which comprises 25 to 60% by weight of a resin component which comprises an epoxy, 5 to 25% by weight of a curing agent which comprises two components, a first component which is a cycloaliphatic amine or an aromatic amine, and a second component which is a polyamide amine, and 20 to 65% by weight of an inert inorganic filler. The curable composition can be used in a method of protecting a substrate such as a pipe or a pipe joint from corrosion or mechanical damage. In the method, the curable composition is first applied to the substrate, polymeric covering layer is applied over the curable composition with an innermost layer of a heat-activatable sealant in intimate contact with the curable composition, and the curable composition is then cured. During the curing process, the heat-activatable sealant, e.g. a hot melt adhesive, remains in contact with the curable composition and interacts therewith.

14 Claims, 1 Drawing Sheet

U.S. PATENT DOCUMENTS

| | | |
|---|---|---|
| 4,207,364 | 6/1980 | Nyberg . |
| 4,211,595 | 7/1980 | Samour . |
| 4,213,486 | 7/1980 | Samour et al. . |
| 4,243,718 | 1/1981 | Murai et al. . |
| 4,287,034 | 9/1981 | Pieslak et al. . |
| 4,331,715 | 5/1982 | Wolpert . |
| 4,345,004 | 8/1982 | Miyata et al. . |
| 4,421,569 | 12/1983 | Dichter et al. . |
| 4,427,725 | 1/1984 | Crofts . |
| 4,455,204 | 6/1984 | Pieslak et al. . |
| 4,477,517 | 10/1984 | Rummel . |
| 4,481,239 | 11/1984 | Eckner . |
| 4,507,340 | 3/1985 | Rinde et al. . |
| 4,510,007 | 4/1985 | Stucke . |
| 4,510,181 | 4/1985 | Okuno et al. . |
| 4,521,470 | 6/1985 | Overbergh et al. . |
| 4,525,414 | 6/1985 | Ohya et al. . |
| 4,542,070 | 9/1985 | Ohtani et al. . |
| 4,568,400 | 2/1986 | Patterson, Jr. et al. . |
| 4,574,023 | 3/1986 | Edwards et al. . |
| 4,634,615 | 1/1987 | Versteegh et al. . |
| 4,707,388 | 11/1987 | Park et al. . |
| 4,729,920 | 3/1988 | McLoughlin et al. . |
| 4,732,632 | 3/1988 | Pieslak et al. . |
| 4,751,270 | 6/1988 | Urawa et al. . |
| 4,997,685 * | 3/1991 | Pieslak et al. .................. 156/86 |

OTHER PUBLICATIONS

U.S. application No. 07/984,806 (Pieslak et al, filed Dec. 3, 1992).

H. Lee and C. Nevill, Reference Manual on Epoxy Resins, Moscow, Energiya, 1973, p. 109.

V.A. Lapitsky et al, Physical and Mechanical Properties of Epoxy Polymers and Glass–Reinforced Plastics, Kiev, Naukova Dumka, 1986, pp. 11–13.

"Versamid® Polyamide Resins, Genamid® Amidoamine Resins Product Information", pp. 3–7, 9, 11–14.

James M. McKelvey, "Polymer Processing", John Wiley and Sons, 1962, pp. 356–359.

Patrick J. Corish, ed., "Concise Encyclopedia of Polymer Processing and Applications", Pergamon Press, 1992, pp. 219–221.

F. Santagata, "The Philosophy of Corrosion Protection of Pipelines Crossing the Straits of Messina, and Its Implementation", UK National Corrosion Conference, 1982, pp. 59–62.

Canusa brochure, "Multi–Layer Sleeves and Tapes".

William A. Dempster et al, "Heat Fused Polyolefin System for Fusion Bonded Epoxy Coated Pipe", 10th International Conference on Pipe Protection, Nov. 1993, pp. 47–58.

S.H. Lee et al, "Evaluation of Poly(propylene–co–1–hexen–6–ol) as an Interfacial Agent in Polypropylene/Glass Laminates", Polymer, vol. 35, No. 14, 1994, pp. 2980–2984.

* cited by examiner

METHOD OF APPLYING PROTECTIVE COVERING TO A SUBSTRATE

CROSS-REFERENCE TO RELATED APPLICATIONS

This application is a continuation application of commonly assigned application Ser. No. 08/481,594, filed Jun. 7, 1995, now abandoned, which is a divisional application of application Ser. No. 08/212,632, filed Mar. 11, 1994, now abandoned.

FIELD OF THE INVENTION

This invention relates to a curable polymeric composition and the use of the composition in protecting a substrate, in particular a metallic pipe.

INTRODUCTION TO THE INVENTION

To protect substrates such as metallic pipes, pipe joints, and pipelines from corrosion, mechanical damage resulting from abrasion, or degradation due to exposure to sun, soil, moisture, or other elements, a protective coating may be applied to the exterior of the pipe. The protective layer is often polymeric and may be in the form of a polymer tape which is coated with a mastic layer and is then applied to the pipe, a polymer layer which is sprayed or painted onto the pipe, or a fusion bonded epoxy coating which has been applied in the factory. Alternatively, the protective layer may be in form of a heat-recoverable article, i.e. a heat-shrinkable polymeric article such as a sleeve, sheet, or tape, which is recovered onto a pipe or substrate. Such heat-recoverable articles are particularly useful in providing protection to pipe wells or joints which are created when pipe is repaired or retrofitted, e.g. when two pieces of pipe are attached to one another. Using a heat-recoverable article allows protection to be applied in the field without the need for difficult, time-consuming, and craft-sensitive procedures.

In order to enhance the adhesion between the pipe and the heat-recoverable article, it is common to use a heat-activatable sealant or a mastic which can bond to both the pipe and the heat-recoverable article. The sealant or mastic is often in the form of a layer which is applied to the surface of the article which is in contact with the substrate. When heat is applied to the article, generally by means of a torch or other heat source, the heat-activatable sealant is activated and the article recovers. A strong bond is thus formed between the polymeric article and the substrate. Alternately or in addition to the heat-activatable sealant, a primer layer, often in the form of a curable polymeric composition such as an epoxy, may be applied to the substrate to improve the adhesion of the heat-recoverable layer to the substrate.

Curable epoxy primers for pipe coating are known. U.S. Pat. No. 3,876,606 (Kehr), the disclosure of which is incorporated herein by reference, discloses a thermosetting epoxy resin which comprises a polyglycidyl ether of polyhydric phenol, a dihydrazide, and a filler such as barium sulfate, calcium carbonate, or mica. The coating has good adhesion to the substrate when subjected to boiling water and also exhibits good cathodic disbonding performance at room temperature and at 60° C. However, the coating is in the form of a powder which is applied to a preheated substrate. Uniform application of such a powder onto a pipe or a pipe joint in the field is difficult, requiring complex equipment and relatively high temperatures.

U.S. Pat. Nos. 4,732,632 and 4,997,685 (Pieslak et al), the disclosures of which are incorporated herein by reference, disclose a method of applying a protective coating onto a substrate. The method comprises applying to the substrate a curable polymeric composition which is a liquid at about 20° C., comprises a resin component and a curing agent, and cures to a substantial extent within 24 hours at a temperature of not more than about 80° C. A polymeric covering layer having an innermost layer of a heat-activatable sealant is applied over the curable composition and the curable composition is then cured while in intimate contact with the innermost layer. The resulting covering has good adhesion to both the substrate and the heat-recoverable article and exhibits good cathodic disbonding performance. It is necessary, however, that the curable composition be selected to meet the specific requirements for each application; a single composition cannot be used for a wide variety of temperature applications.

SUMMARY OF THE INVENTION

We have not discovered a composition that is suitable for use as a primer on a substrate under a variety of temperature conditions which can be prepared by incorporating a particular mixture of amines in the curing agent. Furthermore, unlike some conventional compositions, the composition of the invention contains a relatively nonvolatile curing agent and thus is not subject to evaporation during curing. This means that special precautions need not be taken during shipping, handling, and use. In a first aspect, this invention discloses a curable polymeric composition which is a liquid at 20° C. and which comprises (1) 25 to 60% by weight of a resin component which comprises an epoxy;
(2) 5 to 25% by weight of a curing agent which comprises
  (a) a first component which is a cycloaliphatic amine or an aromatic amine, and
  (b) a second component which is a polyamide amine; and
(3) 20 to 65% by weight of an inert inorganic filer.

Compositions of the invention are particularly useful when used in conjunction with a polymeric covering to provide environmental protection to a substrate such as a pipe. The composition serves to provide excellent adhesion between the substrate and the protective covering which is applied to the curable composition while it is substantially uncured. The innermost layer of the protective covering, generally an adhesive, is held in intimate contact with the curable composition while the curable composition is cured. As a result of the intimate contact, the curable composition of the invention and the adhesive layer are able to interact. Thus the second aspect of the invention provides a method of applying a protective covering to a substrate, said method comprising (A) applying to the substrate a curable polymeric composition according to the first aspect of the invention;
(B) applying a multiple-layer polymeric covering having an innermost layer and an outermost layer over the curable composition in a manner such that said innermost layer is in intimate contact with said composition, the innermost layer comprising uncured polymeric heat activatable sealant capable of interacting with said curable composition; and
(C) allowing the curable composition to cure while maintaining intimate contact between said innermost layer and said composition.

In a third aspect, this invention provides an assembly for protecting a substrate, the assembly comprising
(A) a substrate;
(B) a first layer in contact with the substrate which comprises a cured composition of the first aspect of the invention;
(C) a second layer which contacts the first layer and interacts with it and which comprises a hot melt adhesive; and (D) a third layer which contacts the second layer and which is a polymeric covering.

DETAILED DESCRIPTION OF THE INVENTION

Figure 1:
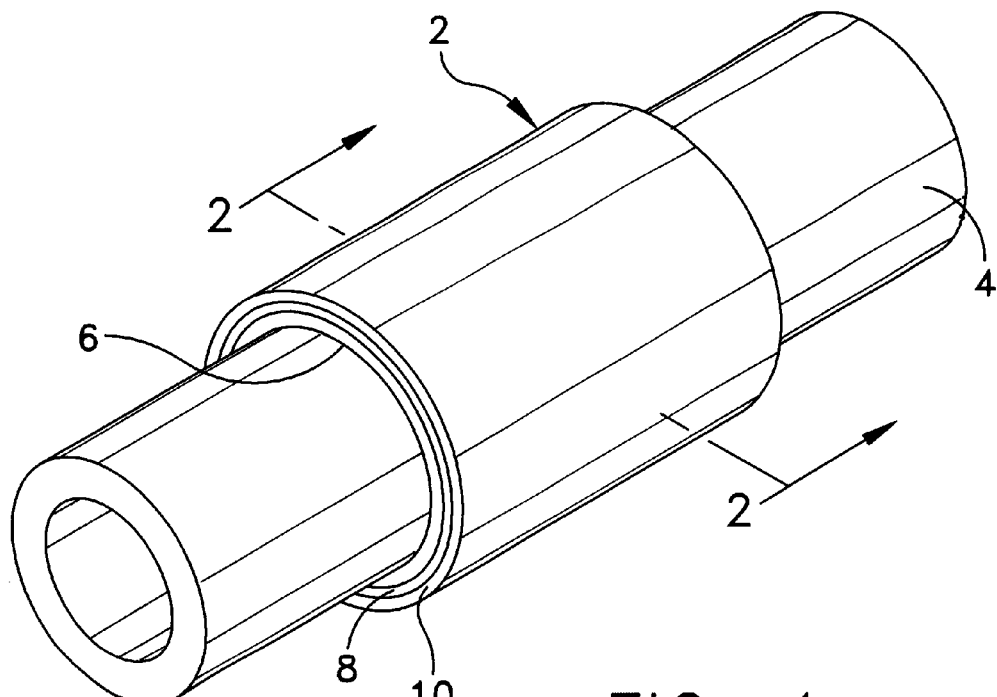
FIG. 1 shows a perspective view of an assembly of the invention in which a heat-recoverable article is positioned on a substrate after recovery.

The composition of the invention is a liquid at 20° C. in its uncured state so that it can be readily applied to a substrate by any appropriate means, e.g. brushing, painting, spraying, or dipping. The viscosity of the uncured composition, as measured at 25° C. according to ASTM-D1084, the disclosure of which is incorporated herein by reference, is 30,000 to 70,000 centipoise. In this application, the "curable composition" is also referred to as a "primer".

In this specification, all references to percentages by weight of the curable composition refer to the uncured composition.

The curable composition comprises 25 to 60%, preferably 30 to 55%, particularly 35 to 50% by weight of the curable composition of a resin component which comprises an epoxy. Appropriate epoxies include bisphenol A epoxies and novalak epoxies, or blends thereof. Particularly preferred is a modified epoxy which is a mixture of a bisphenol A diglycidyl ether polymer and approximately 10% of a multifunctional resin based on 4-glycidyloxy-N-N-diglycidyl aniline. Such a preferred material is sold by Ciba-Geigy under the tradename Araldite™ XULY 366. It is preferred that the resin component and the epoxy be a liquid at 20° C. In addition to the epoxy, the resin component can contain non-volatile plasticizers, e.g. dibutyl phthalate, functionalized epoxy diluents, or a mixture of epoxy resins.

The curable composition also comprises 5 to 25%, preferably 10 to 20% by weight of a curing agent which comprises at least two components. The first component is a cycloaliphatic amine or an aromatic amine. Examples of appropriate cycloaliphatic amines are 4,4'-methylene-bis-(2-ethyl-7-methylcyclohexylamine), 1,3-diaminocyclohexane, isophorone diamine, and menthane diamine. Commercially available cycloaliphatic amines are dicyclohexyl methamine-4,4'-diamine, available from Pacific Anchor as Amicure™ PACM, and other cycloaliphatic amines available from Pacific Anchor under the tradenames Ancamine™ 1770, 2049, 2167X, and 2264X. Examples of appropriate aromatic amines are 4,4'-methylene-bis-(2,6-diethylaniline), 4,4'-methylene-bis-(2-isopropyl-6-methylaniline), 4,4'-methylene-bis-(2,6-diisopropylaniline), 4,4'-methylene dianiline, m-phenylene-diamine, and 4,4'-methylene-bis-(2-ethyl-6-methylaniline), as well as blends of these amines. Commercially available aromatic amines include CMD™ 8401, available from Rhone-Poulenc, and Tonox™ 60-40, available from Uniroyal Chemicals. Whether a cycloaliphatic amine or an aromatic amine is used depends on the available curing conditions and the desired properties of the cured composition. For example, aromatic amines will cure epoxies well only at elevated temperatures, i.e. generally more than 125° C., while unmodified cycloaliphatic amines will cure epoxies well at only slightly elevated temperatures, e.g. 50 to 80° C. In general, the first component is the majority component, i.e. greater than 50%, preferably greater than 60%, of the curing agent on an equivalence basis.

The second component is a polyamide amine. This component serves to provide good adhesion to the polymeric heat activatable sealant, e.g. a hot-melt adhesive, which forms the innermost layer of a polymeric covering. Polyamide amines generally cure at relatively low temperatures, e.g. room temperature. Suitable polyamide amines are available from Henkel under the tradename Versamid, e.g. Versamid™ 140, 125, 115, and 150, and from Pacific Anchor under the tradename Ancamide, e.g. Ancamide™ 260A, 350A, 375A, and 400. The second component generally comprises 10 to 45%, preferably 15 to 40%, particularly 25 to 40% of the total curing agent on an equivalence basis.

Both the first and the second components are reactive curing agents. To ensure that the composition will cure even if a less than optimum mixing ratio has been used, the curing agent often comprises a third component which is a catalytic curing agent. Examples of suitable catalytic curing agents are anionic catalysts such as metal alkoxides, isocyanurates, and materials containing free amine groups. A particularly preferred catalytic curing agent is a tertiary amine. Examples of suitable tertiary amines are pyridine, 2,4,6-tris (dimethylaminomethyl) phenol, benzyldimethyl amine, triethylene diamine, and 1-methyl imidazole. A commercially available tertiary amine (2,4,6-tris(dimethylaminomethyl) phenol) is available from Pacific Anchor under the tradename Ancamine K54. It is preferred that the tertiary amine be present in the composition at a relatively low loading, i.e. less than 10%, preferably less than 5%, particularly less than 3%, especially less than 2%, more especially less than 1% by weight of the curable composition. Furthermore, to minimize the adverse effects of the volatility of the tertiary amine, it is preferred that any tertiary amine which is present be one with relatively low volatility, e.g. have a relatively high molecular weight and/or low vapor pressure.

The amount of curing agent is selected so that the stoichiometric ratio of the epoxy to the curing agent is in the range of 1:0.8 to 1:1.5, preferably in the range of 1:0.9 to 1:1.3, particularly 1:1. In addition, the amount of curing agent and the curing agent blend are selected so that the curable composition can be cured to a substantial extent within about 24 hours at a temperature of not more than 80° C. By "curable to a substantial extent" is meant that the composition has cured to at least 50%, preferably at least 55%, particularly at least 65%, especially at least 80% of its fully cured state. It is preferred that compositions of the invention cure to a substantial extent in less than one hour, e.g. 2 minutes to 30 minutes, at a temperature of 80° C. This relatively rapid cure is advantageous in ensuring that a good bond is achieved to the substrate in a short time, a feature which is important in the field.

It is often preferred that the curing agent comprise at least one substance which is a Bronsted base. A Bronsted base is a molecular substance capable of accepting a proton, i.e. a hydrogen ion. It has been found that strong bonds and resistance to cathodic disbonding are achieved when the curable polymeric composition results in a composition which is basic. To ensure basicity of the cured composition, excess Bronsted base, i.e. an amount in excess of that required to effect curing of the composition, is preferably used. For compositions of the invention, the Bronsted base is generally added in an amount of at least 0.01 moles in excess of that necessary to effect cure of the composition, preferably 0.01 to 2 moles in excess. The amount of Bronsted base must be controlled to avoid producing a cured polymeric composition which does not have adequate hardness or resistance to cathodic disbonding, two qualities which may be adversely affected by the presence of too much Bronsted base. In addition, because the presence of excess Bronsted base decreases the $T_g$ of the cured polymeric composition, it is necessary to ensure that the excess be limited to an amount that achieves the enhanced bonding and cathodic disbonding resistance but does no decrease the $T_g$ below that required for the application. For most applications, it is preferred that the $T_g$ be at least 80° C., preferably at least 90° C., especially at least 100° C. In general, a curable composition with a higher $T_g$ gives better performance at high temperatures.

Also present in the curable composition is an inert inorganic filler which is present in an amount of 20 to 65%, preferably 25 to 60%, particularly 30 to 55% by weight of the total curable composition. In general, the higher the loading of inert filler, the better cathodic disbonding resistance is achieved. A limiting factor on the amount of filler in the composition is the viscosity of the composition. The inorganic filler may comprise one or more of barium sulfate, lithopone (i.e. a mixture of barium sulfate, zinc sulfate, and zinc sulfide), mica, and titanium dioxide. In order to achieve good mixing, it is preferred that the particle size of the filler be less than 5 µm, preferably less than 3 µm, particularly less than 2 µm, e.g. 1 to 2 µm. In order to assist in dispersing the inert filler, it may be coated with a coupling agent or a dispersing agent.

The curable composition may also comprise other additives in an amount up to 10%, preferably up to 8%, particularly up to 6% by weight of the curable composition. Such additives include thixotropic agents (e.g. clay), pigments (e.g. carbon black or titanium dioxide), coupling agents (e.g. silanes), surfactants, dispersing agents, stabilizers, processing aids, metal deactivators, tackifiers, adhesion promoters, hydroxy compounds (e.g. an aliphatic alcohol or water), and other reagents. In addition, up to 5% by weight of the curable composition can be a solvent. It is preferred that there be less than 5%, particularly less than 3%, specially less than 2% by weight of the curable composition, e.g. 0 to 2% by weight, of a solvent in order to minimize the time required to evaporate the solvent when it is being cured. For some applications, however, it is necessary to use solvent in order to achieve an appropriate viscosity for applying the curable composition.

The curable composition is mixed prior to applying to the substrate. Mixing may be achieved by any convenient technique. To maximize the useful shelf life of the curable composition, it is often preferred that the curable composition be supplied in two-part form. The two parts, usually comprising the epoxy in one part (i.e. Part A) and the curing agents in the second part (i.e. Part B), can be combined in the field, just prior to application onto the substrate. Either or both parts may comprise inert inorganic filler and other additives. For ease of mixing, it is often preferred that the two parts have relatively equal viscosities. In addition, the two parts may contain different pigments so that it is easy to se when a uniform mixture of the two parts is achieved, e.g. when the mixed composition is a uniform color. When the composition does comprise two parts, the mixing ratio between the two parts can be adjusted depending on the application but is generally between 40 parts:100 parts and 100 parts:10 parts, preferably between 100 parts:100 parts and 100 parts:25 parts of part A to part B, measured by weight. Whether in one, two, or more parts the curable composition in the uncured state has a flash point of more than 60° C. (140° F.), preferably more than 93° C. (200° F.), as measured according to ASTM D-93 (closed cup method), the disclosure of which is incorporated herein by reference, or an equivalent method. This high flash point allows the curable composition to be shipped without special precautions.

Substrates to be protected by the compositions of the invention are preferably elongate substrates, particularly cylindrical substrates such as pipelines or tubing. It is preferred that the substrate be metallic, e.g. iron, steel, or steel alloys. The method of the invention can be used to adhere to a polymeric coating on the substrate as well as protect the exposed metallic substrate. The curable composition can be applied to the substrate in one or more coats. Subsequent coats may be applied directly to the previous coat or be applied to the polymeric layer which is to come into intimate contact therewith. The curable composition is applied in an amount to provide a coating after curing of 0.05 to 0.76 mm (0.002 to 0.030 inch), preferably 0.05 to 0.64 mm (0.002 to 0.025 inch), particularly 0.05 to 0.25 mm (0.002 to 0.010 inch), especially 0.08 to 0.18 mm (0.003 to 0.007 inch).

Before applying the curable composition, the substrate may be preheated to a temperature of at most 120° C., preferably at most 100° C., particularly at most 90° C., especially at most 80° C. Higher preheat temperatures are not desirable because the rate of cure of the curable composition will be too rapid, limiting the extent to which the curable composition can interact with the inner most layer of the polymeric covering. The preheating may be achieved by means of a torch or other external heat source, or, if the substrate is a filled pipeline, b means of a hot fluid or other substance in the pipeline.

The curable composition is covered by a polymeric covering comprising one or more polymeric layers before it is permitted to cure to a substantial extent, i.e. while it is substantially uncured. The polymeric covering may be applied by any appropriate method, e.g. extrusion, spraying, wrapping, shrinking, pressing, painting, dipping, or electrostatic depositing.

Although a single polymeric layer might be appropriate for some applications, it is preferred, particularly for providing protection to substrates such as pipelines, that the polymeric covering comprise two or more layers. When there are two layers, the innermost layer will be in contact with the curable composition. The layers comprising the polymeric covering may be the same or different materials and may have the same or different physical and chemical properties. It is generally preferred that the layers be different in order to achieve different results. For example, the innermost layer is generally an uncured polymeric heat-activatable sealant capable of interacting with the curable composition. A preferred heat-activatable sealant is a hot melt adhesive. The hot melt adhesive can be any sealant typically used to bond corrosion protection coatings to metal and particularly those generally used to bond a coating to a pipeline which is cathodically protected to protect the pipeline from corrosion, abrasion, or impact damage. Such hot melt adhesives include those based on thermoplastic polyamides, polyolefins, polyesters, polyurethanes, polysulfides. Especially preferred are polyamide-, ethylene copolymer-, or ethylene terpolymer-based hot melt adhesives. Particular preferred are hot melt adhesives containing ethylene copolymers or ethylene terpolymers, e.g. copolymers or terpolymers of ethylene with one or more of vinyl acetate, maleic anhydride, acrylic acid, methacrylic acid or alkyl acrylate such as ethyl acrylate. When protection is required at relatively high temperature, e.g. more than 100° C., it is preferred that the adhesive comprise polypropylene or modified polypropylene, as discussed in U.S. patent application Ser. No. 07/984,806 (Pieslak et al, filed Dec. 3, 1992) and International Patent Application No. PCT/US93/11686 (Raychem Corporation, filed Dec. 2, 1993), the disclosures of which are incorporated herein by reference. The adhesive may also contain various additives, e.g. waxes, rubbers, stabilizers, and pigments. The innermost layer is generally applied, e.g. by painting, spraying, or other convenient means, onto one surface of the outermost layer.

The outermost layer is preferably a preformed shaped article. It is particularly preferred that the outermost layer be a heat-recoverable polymeric article, generally in the form of a sleeve, sheet, tube, or tape. The polymeric material of the article has been crosslinked during the production process so as to enhance the desired dimensional recovery. One method of producing a heat-recoverable article comprises shaping the polymeric material into the desired heat-stable form, subsequently crosslinking the polymeric material, heating the article to a temperature above the crystalline melting point of the polymer (or, for amorphous materials, the softening point of the polymer), deforming the article, and cooling the article while in the deformed state so that the deformed state of the article is retained. In use, because the deformed state of the article is heat-unstable, application of heat, by means of a torch or other heat source, will cause the article to assume its original heat-stable shape, and, for many applications, the article is designed to shrink down onto the substrate. The outermost layer acts as an environmental protection layer over the substrate, and it is important that the curable composition be allowed to cure at a temperature which does not cause the outermost layer to melt or flow. The outermost layer preferably comprises a polyolefin such as polyethylene or polypropylene, although for some applications elastomers or rubbers such as acrylic rubber, EPDM, nitrile rubber, or butyl rubber may be used. As with the innermost layer, the outermost layer may comprise additives, e.g. waxes, rubbers, stabilizers, crosslinking promoters, and pigments.

The curable compositions of the invention are particularly useful in providing good resistance to cathodic disbonding. Cathodic disbonding occurs as a result of he impressed electric current that is applied to the pipe to prevent corrosion of the iron in the steel pipe. Many adhesive compositions which are used to bond a protective coating onto a pipe are adversely affected by the impressed electric current. As a result, the bond weakens and the adhesive pulls away from the pipe, leaving segments of the pipe surface exposed to the corrosive conditions of the environment.

The curable compositions of the invention can be used to prepare an assembly of the invention. A substrate, often an elongate substrate such as a pipe or a pipe joint, is coated at least partially with a first layer which comprises a curable composition of the invention. The first layer is in contact with, and preferably completely surrounded or covered by, a second layer which is a heat-activatable sealant such as a hot-melt adhesive. The second layer interacts with the first layer to form a strong bond, generally due to interaction occurring during the curing of the curable composition. The second layer is in contact with, and preferably completely surrounded or covered by, a third layer which is a polymeric covering. The polymeric covering may be in the form of a tape, sleeve, tube, sheet, film or other self-supporting layer. Often the polymeric covering is a heat-recoverable article which has been preshaped and which is capable of conforming to the shape of the substrate on recovery. For ease of use, the second layer is often attached to the third layer, e.g. by painting or brushing, prior to bringing the second layer into contact with the first layer.

The invention is illustrated by the drawing in which FIG. 1 shows an assembly of the invention. A heat-recoverable article 2 in the form of a polymeric tube has been recovered onto substrate 4 which is a pipe. The pipe is coated with a primer layer formed from a curable composition 6. Adhesive layer 8 which may be part of the heat-recoverable article 2 lies between the curable composition 6 and the backing layer 10 of heat-recoverable article 2.

Figure 2:
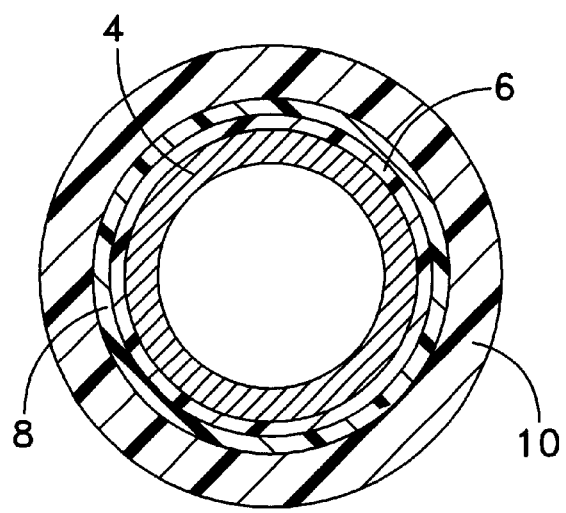
FIG. 2 shows a cross-sectional view of the article of the invention along line 2—2 of FIG. 1.

Shown in FIG. 2 is a cross-sectional view along line 2—2 of FIG. 1. Visible in this view are the primer layer 6, the adhesive layer 8, and the polymeric backing layer 10.

The invention is illustrated by the following examples.

EXAMPLES 1 TO 8

The ingredients listed in Table I for each example were mixed by blending 100 grams of the epoxy (Part A) with the specified amount of the premixed remaining ingredients (Part B) to produce curable compositions in the ratio given as weight percent. Each of the compositions was painted onto a substrate and allowed to cure for 7 days at room temperature (25° C.) 16 hours at 80° C., or 16 hours at 120° C. before measuring the glass transition temperature by means of a thermal mechanical analyzer (TMA).

The performance of each of the curable compositions was measured for resistance to cathodic disbonding following the procedure of ASTM G-42, the disclosure of which is incorporated herein by reference. In that test, a freshly shot-blasted steel pipe with an outer diameter of 57 mm (2.25 inches) and a length of 0.3 meter (12 inches) was preheated to 80° C. and the curable composition was painted onto the surface of the pipe. A heat-shrinkable outer layer made from a composition comprising high density polyethylene, ethylene/methyl acrylate copolymer, ethylene-propylene diene rubber (EPDM), carbon black, and antioxidants was coated with a hot melt adhesive comprising a terpolymer of ethylene, ethyl acrylate, and acrylic acid, was applied to the coated pipe and recovered by heating with a propane torch. The end of the pipe which was to be immersed was sealed with a watertight end cap. A 6 mm (0.24 inch) hole (holiday) was drilled through the backing and the adhesive (but not through the pipe) in the center of the pipe to expose the metal surface of the pipe at that point. The pipe was then immersed in an electrolyte solution comprising water and 1% by weight of each of sodium chloride, sodium sulfate, and sodium carbonate. A potential of 1.5 volts was applied to the pipe, thus making the pipe a cathode in the electrolyte solution which also contained a sacrificial anode. The sample and electrolyte solution were maintained at 80° C. for 30 days. The pipe was then removed and the area around the holiday inspected to determine the extent of disbondment. The approximate radius of the disbondment area surrounding the holiday was measured in millimeters (mm) and recorded.

Those compositions comprising high levels of inert filler had good cathodic disbonding performance, i.e. a disbonding radius of less than 25 mm.

TABLE I

| | Example | | | | | | | |
|---|---|---|---|---|---|---|---|---|
| Material/Test | 1 | 2 | 3 | 4 | 5 | 6 | 7 | 8 |
| Epoxy 1 | 45.1% | 67.9% | 63.2% | 48.8% | 66.2% | 46.5% | 50.0% | 61.2% |
| Amine 1 | 6.1% | 3.2% | 3.9% | 5.1% | 6.9% | 2.9% | 2.4% | 8.3% |
| Amine 2 | 14.3% | 18.2% | 22.1% | 11.9% | 16.1% | 16.2% | 13.4% | 19.4% |
| Filler 1 | 30.9% | 6.1% | 6.6% | 31.0% | 6.3% | 30.7% | 30.9% | 7.0% |
| Additives | 3.6% | 4.6% | 4.2% | 3.2% | 4.5% | 3.7% | 3.3% | 4.1% |
| Stoich, Ratio | 1:1.3 | 1:1 | 1:1.3 | 1:1 | 1:1 | 1:1.3 | 1:1 | 1:1.3 |
| Part B (grams) | 121.5 | 47.3 | 58.3 | 105.0 | 51.0 | 114.9 | 100.0 | 63.4 |

TABLE I-continued

| | Example | | | | | | | |
|---|---|---|---|---|---|---|---|---|
| Material/Test | 1 | 2 | 3 | 4 | 5 | 6 | 7 | 8 |
| CD at 80° C. (mm) | 19.5 | 55.5 | 73.5 | 14 | 37 | 22.5 | 17.5 | 62.5 |
| Tg (7 day/25° C.) | 44.3 | 46.3 | 49.4 | 41.0 | 42.8 | 45.8 | 44.1 | 47.5 |
| Tg 16 hr/80° C.) | 94.2 | 98.2 | 97.7 | 95.5 | 94.9 | 94.9 | 95.9 | 96.4 |
| Tg (16 hr/120° C.) | 96.2 | 144.4 | 113.9 | 135.1 | 138.8 | 111.9 | 141.4 | 106.6 |

Notes to Table I:
Expoxy 1 is mixture of a bisphenol A diglycidyl ether polymer and approximately 10% of a multifunctional resin based on 4-glycidyloxy-N-N-diglycidyl aniline, sold by Ciba-Geigy under the tradename Araldite ™ XULY 366. This is Part A.
Amine 1 is a polyamide amine, sold by Henkel under the tradename Versamid ™ 140.
Amine 2 is an aromatic amine, sold by Rhone-Poulenc under the tradename CMD ™ 8401.
Filler 1 is barium sulfate (barytes) with a particle size of less than 5 µm, sold by Whittaker, Clark & Daniels.
Additives are a mixture of a thixotrope, carbon black, an amino silane, a flow control/leveling agent, and reagent alcohol.
Stoich. Ratio is the stoichiometric ratio of the expoxy to the curing agent.
Part B is the total amount of part B in grams added to 100 grams of part A.
CD at 80° C. is the radius in mm of tests run to determine cathodic disbonding at 80° C.
Tg represents the glass transition temperature of the composition after curing under different conditions.

EXAMPLE 9 (Comparative Example)

In order to test the performance of compositions of the invention compared to conventional fusion bonded epoxy powders, a composition was prepared in accordance with Example 1 of U.S. Pat. No. 3,876,606 (Kehr, Apr. 8, 1975), the disclosure of which is incorporated herein by reference. A composition containing about 42.6% by weight polyglycidyl ether, 0.4% flow control agent, 0.4% catalyst (2,4,6-tris(dimethylamino methyl)phenol), 2.1% pigment (chromium oxide and titanium dioxide), 0.1% halogenated phthalocyanine, 51.1% by weight barium sulfate, and 3.3% azelaic dihyrazide was prepared in a powder form and coated onto a pipe which had been preheated to 230° C. The powder immediately fused to form a solid coating. The pipe was tested following the procedure of ASTM G-42, described above, under three different conditions: at 60° C. and 6 volts for 6 days; at 60° C. and 1.5 volts for 30 days; and at 80° C. and 1.5 volts for 30 days. The results, shown in Table II, indicated that the coating degraded under all three conditions, blistering so badly that the coating could be completely peeled off the pipe.

EXAMPLES 10 TO 13

Following the procedure of Examples 1 to 8, curable compositions as shown in Table III were prepared. Example 12 was a comparative example. Each of the compositions comprised two parts, Part A which contained the epoxy, and Part B which contained the curing agents. The compositions were coated onto pipe preheated to 60° C. for the 60° C. tests and to 80° C. for the 80° C. tests, and covered with an adhesive-coated polyethylene covering layer as described above. For the tests at 60° C., the adhesive layer comprised a terpolymer of ethylene, vinyl acetate, and methacrylic acid; for the tests at 80° C., the adhesive comprised a terpolymer of polyethylene, ethyl acrylate, and acrylic acid. The cathodic disbonding performance was then measured under the same conditions as Example 9. The results, shown in Table II, indicated that the compositions of the invention had generally good performance at 60° C. and 80° C. A cathodic disbonding radius of less than 25 mm was considered good performance.

For Examples 10 and 13, the peel strength at 23° C., 60° C., and 80° C. was measured following the disclosure of ASTM D-1000, the disclosure of which is incorporated herein by reference. In addition, for Example 10, a test was done at 110° C. using a polypropylene-based adhesive and polypropylene covering layer as described in U.S. patent application Ser. No. 07/984,806 and International Patent Application No. PCT/US93/11686. In the peel test, thee pipe with the curable composition and the recovered adhesive-coated polymeric covering layer was cut into test specimens with a width of 25 mm (1 inch). Each specimen was cut parallel to the direction of the pipe to create a free end which was clamped in the jaw of an Instron™ tester. After allowing the sample to equilibrate to the desired temperature (23° C., 60°, 80°, or 110° C.) in the thermal chamber of the tester, the jaw separation speed of the Instron™ tester was set at 51 mm/minute (2 inches /minute). The amount of force required to peel the layer from the pipe was recorded as pounds/linear inch (pli). The result are shown in Table IV. In all cases but one there was adhesive failure to the polymeric covering layer. The one exception, indicated by "AP", showed an adhesive failure to the primer.

TABLE II

| | Example | | | | |
|---|---|---|---|---|---|
| Test Condition | 9† | 10 | 11 | 12† | 13 |
| 60° C./6 volts/6 days | B, D* | 6 | AP* | 11 | — |
| 60° C.1.5 volts/30 days | B, D | 7 | AP | 12 | 11 |
| 80° C.1.5 volts/30 days | TD | 13 | 20 | TD | 16 |

*Notes to Table II:
B indicates blistering of the coating.
D indicates some degradation of the coating.
TD indicates total degradation of the coating and complete disbonding from the pipe.
AP indicates adhesive failure to the primer.
†indicates a comparative example.

TABLE III

Formulations in Weight Percent

| Material | Example 10 | Example 11 | Example 12 | Example 13 |
|---|---|---|---|---|
| Epoxy 1 | 50.0 | 50.0 | | 47.8 |
| Epoxy 2 | | | 51.3 | |
| Amine 1 | 5.0 | 11.6 | | 4.6 |
| Amine 2 | | 5.0 | | |
| Amine 3 | | | 23.7 | |
| Amine 4 | | | 4.9 | |
| Amine 5 | 9.8 | | | 9.0 |
| Amine 6 | 1.0 | | | 0.9 |
| Filler 1 | 30.4 | 30.3 | | 31.9 |
| Filler 2 | | | 15.7 | 3.8 |
| Additive 1 | 3.8 | 3.1 | | 2.0 |
| Additive 2 | | | 4.4 | |
| Filler 1 Location | 100% B | 100% B | | 34.2% A 65.8% B |
| Filler 2 Location | | | 100% A | 100% A |
| A/B Mix Ratio | 100/100 | 100/100 | 100/40 | 100/60 |

Notes to Table III:
Epoxy 1 is mixture of a bisphenol A diglycidyl ether polymer and approximately 10% of a multifunctional resin based on 4-glycidyloxy-N-N-diglycidyl aniline, sold by Ciba-Geigy under the tradename Araldite ™ XULY 366.
Epoxy 2 is a bisphenol A epoxy, sold by Shell under the tradename Epon ™ 828.
Amine 1 is a polyamide amine, sold by Henkel under the tradename Versamid ™ 140.
Amine 2 is an aromatic amine, sold by Rhone-Poulenc under the tradename CMD ™ 8401.
Amine 3 is a polyamide amine, sold by Henkel under the tradename Versamid ™ 125.
Amine 4 is DMAPA (dimethylaminopropyl amine).
Amine 5 is a cycloaliphatic amine, dicyclohexyl methamine-4,4'-diamine, sold by Pacific Anchor under the tradename Amicure ™ PACM.
Amine 6 is a tertiary amine, 2,4,6-tris(dimethylaminomethyl) phenol, sold by Pacific Anchor under the tradename Ancamine ™ K54.
Filler 1 is barium sulfate (barytes) with a particle size of less than 5 μm, sold by Whittaker, Clark & Daniels.
Filler 2 is lithopone with a particle size of less than 5 μm, sold by Sachtleben Chemie GmbH.
Additive 1 is a mixture of a thixotrope, carbon black, an amino silane, a flow control/leveling agent, and reagent alcohol.
Additive 2 is a mixture of carbon black, a silane, and a flow control/leveling agent.
Filler 1 Location indicates whether Filler 1 was in Part A or Part B of the two-part curable composition.
Filler 2 Location indicates whether Filler 2 was in Part A or Part B of the two-part curable composition.
A/B Mix Ratio means the parts by weight of Part A mixed with the parts by weight of Part B.

TABLE IV

| | Peel Strength (pounds/linear inch) | | | | | |
|---|---|---|---|---|---|---|
| | 60° C. Samples | | 80° C. Samples | | 110° C. Samples | |
| Example | 23° C. | 60° C. | 23° C. | 80° C. | 23° C. | 110° C. |
| 10 | 22.5 AP | 1.1 | 14.5 | 2.2 | 20.2 | 0.7 |
| 13 | 25.0 | 0.7 | 18.7 | 1.2 | — | — |

What is claimed is:

1. A method of applying a protective covering to a substrate, said method comprising (A) applying to the substrate a curable polymeric composition which is a liquid at 20° C. and which comprises
  (1) 25 to 60% by weight of a resin component which comprises an epoxy;
  (2) 5 to 25% by weight of a curing agent which comprises
    (a) a first component which (i) comprises more than 50% of the total curing agent on an equivalence basis, and (ii) is a cycloaliphatic amine or an aromatic amine, and
    (b) a second component which (i) comprises 10 to 45% of the total curing agent on an equivalence basis, and (ii) is a polyamide amine; and
  (3) 20 to 65% by weight of an inert inorganic filler;
(B) applying a multiple-layer polymeric covering having an innermost layer and an outermost layer over the curable composition in a manner such that said innermost layer is in intimate contact with said composition, the innermost layer comprising uncured polymeric heat activatable sealant capable of interacting with said curable composition; and
(C) allowing the curable composition to cure while maintaining intimate contact between said innermost layer and said composition.

2. A method according to claim 1 wherein the heat activatable sealant comprises a hot melt adhesive.

3. A method according to claim 2 wherein the hot melt adhesive is based on a polyamide, an ethylene copolymer, or an ethylene terpolymer.

4. A method according to claim 1 wherein the curable composition comprises a tertiary amine.

5. A method according to claim 1 wherein the substrate is heated prior to applying the curable composition to a temperature of not more than 120° C.

6. A method according to claim 5 wherein the substrate is heated to a temperature of not more than 100° C.

7. A method according to claim 1 wherein the polymeric covering is a heat-recoverable article.

8. A method according to claim 7 wherein heat is applied to the heat-recoverable article to recover the article, activate the heat activatable sealant, and cure the curable composition.

9. A method according to claim 1 wherein the curing agent further comprises a Bronsted base.

10. A method according to claim 1 wherein the epoxy comprises a bisphenol A epoxy resin.

11. A method according to claim 1 wherein the inorganic filler comprises barium sulfate, lithopone, titanium dioxide, mica, or a mixture thereof.

12. A method according to claim 1 wherein the filler has an average particle size of less than 5 μm.

13. A method according to claim 1 wherein the stoichiometric ratio of the epoxy to the curing agent is in the range of 1:0.8 to 1:1.5.

14. A method according to claim 1 wherein the stoichiometric ratio of the epoxy to the curing agent is 1:1.

* * * * *